US007120456B1

(12) United States Patent
Elliot et al.

(10) Patent No.: US 7,120,456 B1
(45) Date of Patent: Oct. 10, 2006

(54) WIRELESS TERMINALS WITH MULTIPLE TRANSCEIVERS

(75) Inventors: Brig Barnum Elliot, Arlington, MA (US); Anthony Michel, Lexington, MA (US); Jerry D. Burchfiel, Waltham, MA (US)

(73) Assignee: BBN Technologies Corp., Cambridge, MA (US)

( * ) Notice: Subject to any disclaimer, the term of this patent is extended or adjusted under 35 U.S.C. 154(b) by 406 days.

(21) Appl. No.: 10/039,308

(22) Filed: Nov. 7, 2001

(51) Int. Cl.
*H04Q 7/20* (2006.01)
*H04B 7/00* (2006.01)

(52) U.S. Cl. .................... 455/517; 455/519; 455/7; 370/310

(58) Field of Classification Search .............. 455/450, 455/446, 447, 448, 518, 519, 507, 422, 7, 455/517; 370/335, 310, 245, 242
See application file for complete search history.

(56) References Cited

U.S. PATENT DOCUMENTS

| 4,152,647 A | 5/1979 | Gladden et al. |
| 4,284,848 A | 8/1981 | Frost |
| 4,409,687 A | 10/1983 | Berti et al. |
| 4,613,990 A | 9/1986 | Halpern |
| 4,718,002 A | 1/1988 | Carr |
| 4,864,559 A | 9/1989 | Perlman |
| 4,941,200 A | 7/1990 | Leslie et al. |
| 4,999,833 A | 3/1991 | Lee |
| 5,034,967 A | 7/1991 | Cox et al. |
| 5,050,189 A | 9/1991 | Cox et al. |
| 5,093,824 A | 3/1992 | Coan et al. |
| 5,155,859 A | 10/1992 | Harris et al. |
| 5,218,356 A | 6/1993 | Knapp |
| 5,243,592 A | 9/1993 | Parlman et al. |
| 5,303,286 A | 4/1994 | Wiedeman |
| 5,307,509 A | 4/1994 | Michalon et al. |
| 5,361,399 A | 11/1994 | Linquist et al. |
| 5,363,375 A | 11/1994 | Chuang et al. |
| 5,371,734 A | 12/1994 | Fischer |
| 5,491,837 A | 2/1996 | Haartsen |

(Continued)

FOREIGN PATENT DOCUMENTS

WO    WO 94/29986    12/1994

OTHER PUBLICATIONS

Aceves et al., "Analysis of Routing Strategies for Packet Radio Networks," Proc. Of the IEEE INFOCOM, pp. 292-302, 1985.

(Continued)

*Primary Examiner*—Tilahun Gesesse
(74) *Attorney, Agent, or Firm*—Fish & Neave IP Group Ropes & Gray LLP

(57) ABSTRACT

A wireless network [100] includes a number of first wireless terminals configured to operate as cluster heads [110] by communicating with at least one other cluster head over a relatively long range backbone link [115]. Each one of the first wireless terminals includes a backbone transceiver. The backbone transceivers may operate in a first frequency range. At least one second wireless terminal is configured to operate as a cluster member [120] by communicating with an associated cluster head over a local link. Each one of the second wireless terminals includes a cluster transceiver. The cluster transceivers may operate in a second frequency range that is different from the first frequency range of the backbone transceivers. At least one of the first and second wireless terminals includes both a backbone transceiver and a cluster transceiver.

11 Claims, 8 Drawing Sheets

U.S. PATENT DOCUMENTS

| | | | | |
|---|---|---|---|---|
| 5,497,368 | A | 3/1996 | Reijnierse | |
| 5,551,056 | A | 8/1996 | Koponen et al. | |
| 5,652,751 | A | 7/1997 | Sharony | |
| 5,850,592 | A * | 12/1998 | Ramanathan | 455/7 |
| 5,881,246 | A | 3/1999 | Crawley et al. | |
| 5,913,921 | A | 6/1999 | Tosey et al. | |
| 5,966,668 | A | 10/1999 | Lindroth | |
| 5,987,011 | A * | 11/1999 | Toh | 370/331 |
| 6,026,077 | A | 2/2000 | Iwata | |
| 6,028,857 | A | 2/2000 | Poor | |
| 6,046,978 | A | 4/2000 | Melnik | |
| 6,049,720 | A | 4/2000 | Rude | |
| 6,115,580 | A | 9/2000 | Chuprun | |
| 6,205,117 | B1 | 3/2001 | Doshi et al. | |
| 6,304,556 | B1 * | 10/2001 | Haas | 370/254 |
| 6,304,745 | B1 | 10/2001 | Monch | |
| 6,307,843 | B1 | 10/2001 | Okanoue | |
| 6,317,436 | B1 | 11/2001 | Young et al. | |
| 6,349,091 | B1 | 2/2002 | Li | |
| 6,430,150 | B1 | 8/2002 | Azuma et al. | |
| 6,456,599 | B1 * | 9/2002 | Elliott | 370/254 |
| 6,487,186 | B1 * | 11/2002 | Young et al. | 370/336 |
| 6,493,759 | B1 * | 12/2002 | Passman et al. | 709/227 |
| 6,512,935 | B1 | 1/2003 | Redi | |
| 6,662,229 | B1 | 12/2003 | Passman et al. | |
| 6,711,409 | B1 * | 3/2004 | Zavgren et al. | 455/445 |
| 6,735,448 | B1 | 5/2004 | Krishnamurthy et al. | |
| 6,744,740 | B1 | 6/2004 | Chen | |
| 2002/0082035 | A1 * | 6/2002 | Aihara et al. | 455/518 |

OTHER PUBLICATIONS

Hahn et al., "Packet Radio Network Routing Algorithms," A. Survey, 22(11):41-47, 1984.

Jubin et al., "The DARPA Packet Radio Network Protocols," Proc. Of the IEEE, 75(1):21-32, 1987.

Kahn, "The Organization of Computer Resources into a Packet Radio Network," IEEE Trans. On Communication, vol. COM-25(1):169-178, 1977.

Lauer, Gregory, "Packet Radio Routing," Routing in Communication Networks, Ch. 11, Martha Steenstrup, Prentice Hall, 1995.

Moy, John, "Link-State Routing," Routing in Communication Networks, Ch. 5, Martha Steenstrup, Prentice Hall, 1995.

* cited by examiner

WIRELESS TERMINALS WITH MULTIPLE TRANSCEIVERS

CROSS REFERENCE TO RELATED APPLICATIONS

The instant patent application is related to co-pending U.S. patent application Ser. No. 09/513,757, entitled "A NODE BELONGING TO MULTIPLE CLUSTERS IN AN AD-HOC WIRELESS NETWORK", filed Feb. 25, 2000; U.S. patent application Ser. No. 09/584,973, entitled "METHOD AND APPARATUS FOR VARYING THE RATE AT WHICH BROADCAST BEACONS ARE TRANSMITTED", filed Jun. 1, 2000; U.S. patent application Ser. No. 09/624,635, entitled "CLUSTER HEAD RESIGNATION TO IMPROVE ROUTING IN MOBILE COMMUNICATION SYSTEMS", filed Jul. 24, 2000; U.S. patent application Ser. No. 09/660,521, entitled "USING DIRECT CLUSTER MEMBER TO CLUSTER MEMBER COMMUNICATION TO IMPROVE PERFORMANCE IN MOBILE COMMUNICATION SYSTEMS," filed Sep. 12, 2000; and U.S. Pat. No. 5,850,592, entitled "METHOD FOR SELF-ORGANIZING MOBILE WIRELESS STATION NETWORK", filed Jan. 11, 1996 as U.S. patent application Ser. No. 09/584,492, and issued Dec. 15, 1998, all being incorporated herein by reference in their entirety.

BACKGROUND OF THE INVENTION

1. Field of the Invention

The present invention relates to wireless data communication networks and more particularly to such a network that employs mobile wireless terminals and that automatically organizes itself for efficient operation.

2. Description of Related Art

Wireless data communications networks may be constructed where a number of (possibly mobile) stations will automatically organize themselves into a hierarchical network. The hierarchical network may contain one or more clusters of stations, each cluster having one cluster head and zero or more cluster members. The cluster heads may operate at a relatively high power level to provide longer distance network links, also known as backbone links, for the network. The cluster members may operate at a lower power in the same frequency band to communicate with the cluster heads. Such self-organizing, or ad-hoc, networks may adaptively reorganize in the face of movement or destruction of cluster heads.

FIG. 1 illustrates a communications network 100 that employs a group of similar (possibly mobile) stations, some of which operate as cluster heads 110. The cluster heads 110 may be interconnected by one or more backbone links 115. Each cluster head 110 defines a cluster, and the cluster may include zero or more cluster members 120. The cluster members 120 communicate directly with the cluster heads 110 through communication links. The dashed line 130 illustrates one such cluster, containing cluster head 110 and two cluster members 120.

The cluster heads 110 and the cluster members 120 may be similar in construction, for example a single model of radio that may transmit at different signal powers. In the exemplary network 100, each station 110/120 may transmit at either a relatively high power level that is suitable for relatively long network links (e.g., cluster heads 110) or at a relatively low power level that is suitable for relatively long or relatively short network links (e.g., cluster members 120). Likewise, each station 110/120 may operate in at least two basic modes. One of the modes (e.g., for cluster heads 110) may be as a "backbone radio" for providing message transit between a number of cluster members and another cluster head. The other mode (e.g., for cluster members 120) may be as a "cluster radio" for providing relatively local message access to the cluster head 110 or to other cluster members 120. The cluster head stations operate at the relatively high power level to communicate with other cluster head stations, and thereby form network backbone 115.

Each station 110/120 has both transmitting and receiving capabilities (i.e. operates as a transceiver). The network 100 may, for example, be operated as a packet switched digital data network for communicating messages from one station to another once its configuration is established. As is understood by those skilled in the art, procedures exist for routing messages over a network, even when the configuration of the network may occasionally change. Likewise, there are procedures for measuring or rating the connectivity of a network in particular configurations.

Though FIG. 1 illustrates a particular interconnection of the various stations 110/120 shown, it should be understood that other patterns of connections are possible. Further, the pattern of connections can change during operation, both to accommodate the introduction of new stations and to allow for the withdrawal or movement of one of the existing stations. The mode of operation of each station may be controlled by an embedded microprocessor in accordance with known network self-organization and communication algorithms.

Using a similar station for both cluster heads 110 and cluster members 120 may result in the overall system 100 being too expensive. For example, if the majority of the stations become configured as cluster members 120, the added functionality for becoming cluster heads in these stations may increase the per-station cost over, for example, dedicated cluster member stations. Further, if both cluster heads 110 and cluster members 120 utilize the same wireless channel, system throughput may suffer. Also, networks that use a single type of transceiver necessarily are limited in future expandability (i.e., incorporating new or different transceivers within the network). Thus, systems with a single transceiver may not be able to employ a mixture of microwave and VHF radio links in a single network, nor a mixture of acoustic and radio links, nor a mixture of infrared broadcast and laser links, etc.

Accordingly, there exists a need for self-organizing communication networks that avoid the shortfalls of such networks that utilize only one type of transceiver for both cluster heads and cluster members.

SUMMARY OF THE INVENTION

Systems and methods, consistent with principles of the invention, address this and other needs by providing multiple transceivers within a wireless terminal. Thus, a terminal may contain one or more backbone transceivers and one or more cluster transceivers to allow the terminal to communicate with other terminals that may contain different types of transceivers.

In accordance with the purpose of the invention as embodied and broadly described herein, a method for integrating a wireless terminal into a wireless network includes determining whether the wireless terminal contains one or more functioning cluster transceivers, and attempting to affiliate the wireless terminal with a cluster head as a cluster member if the wireless terminal contains one or more functioning cluster transceivers. The wireless terminal may operate as a cluster head if the wireless terminal does not contain one or more functioning cluster transceivers.

In another implementation consistent with principles of the invention, a method for configuring a wireless terminal within a wireless network includes operating the wireless terminal as a cluster head, and determining whether a cluster defined by the wireless terminal contains one or more functioning cluster radios. The terminal continues to operate as a cluster head if the cluster contains no functioning cluster radios. The method may also ascertain whether continued operation of the wireless terminal as a cluster head is necessary if the cluster contains one or more functioning cluster radios. The terminal may attempt to resign as the cluster head if the continued operation of the wireless terminal as a cluster head is not necessary.

In a further implementation consistent with principles of the invention, a wireless network includes a group of first wireless terminals configured to operate as cluster heads by communicating with at least one other cluster head over one or more backbone links. Each of the first wireless terminals includes one or more backbone transceivers. At least one second wireless terminal is configured to operate as a cluster member by communicating with an associated cluster head over one or more local links. Each of the second wireless terminals includes one or more cluster transceivers. At least one of the first and second wireless terminals includes both a backbone transceiver and a cluster transceiver.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods, consistent with the principles of the invention, provide a self-organizing wireless network including a number of wireless terminals. Each wireless terminal may include a number of different transceivers (e.g., radios), including one or more cluster radios to enable the terminal to function as a cluster member and/or one or more backbone radios to enable the terminal to function as a cluster head. Cluster radios and backbone radios may be different types of radios that operate in different frequency bands. Preferably, a terminal will contain at least one cluster radio and at least one backbone radio, but a terminal may also contain only one radio, either of cluster or backbone type.

Exemplary Wireless Terminal Configuration

Figure 1:
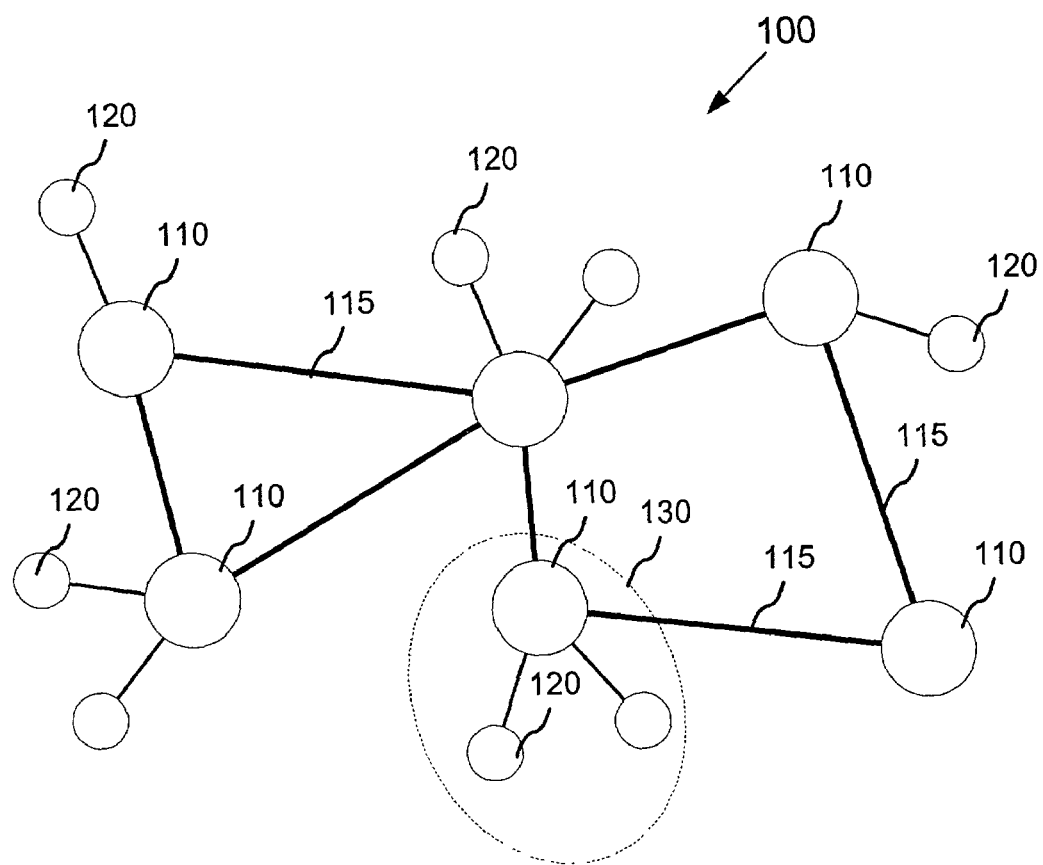
FIG. 1 is a diagram illustrating a self-organizing wireless communications network.
Figure 2:
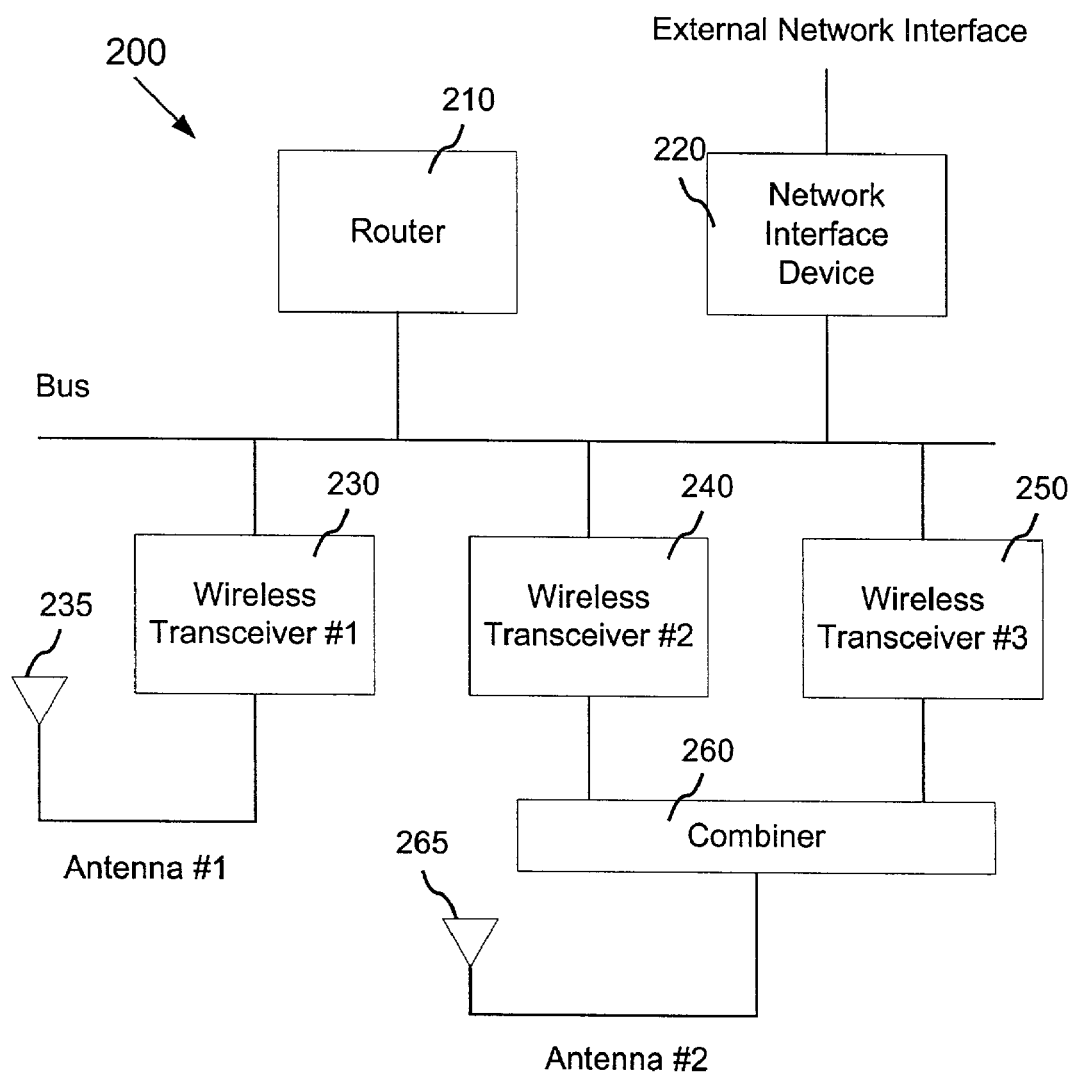
FIG. 2 is a schematic diagram illustrating a wireless terminal that includes multiple transceivers in accordance with an implementation consistent with the present invention.

FIG. 2 is a schematic diagram illustrating a wireless terminal 200 that includes multiple transceivers in accordance with an implementation consistent with the present invention. Wireless terminal 200 may include a router 210, a network interface device 220, three wireless transceivers 230–250, a combiner 260, and two antennas 235/265. The wireless terminal 200 may also include one or more input devices such as a keyboard, stylus, etc. (not shown) and one or more output devices such as a display screen (not shown). The wireless terminal 200 may be either stationary or mobile (e.g., mounted on a vehicle or carried by a person).

The router 210 may include a processor (not shown) configured to execute wireless networking algorithms. The processor in router 210 may include a general purpose processor, one or more application-specific integrated circuits (ASICs), field programmable gate arrays (FPGAs), digital signal processors (DSPs), etc. The processor in router 210 may host software such as an internet protocol (IP) routing routine, network management functions, application programs, etc. Router 210 may be connected to and may communicate with other components of the wireless terminal 200 via a system bus.

Network interface device 220 may include, for example, an Ethernet hardware card and its associated controller. The device 220 may include other types of interface hardware that provides a physical connector with which to interface with an external network.

Wireless transceivers 230–250 may include any type of wireless transceiver, including radio frequency (RF), acoustic, infrared, or microwave transceivers. Other types of transceivers that may send and receive signals are possible. For ease of reference, these transceivers may be referred to as "radios." The transceivers 230–250 may also include components such as processors, DSPs, ASICs, or special RF equipment. Although antenna 235 has been illustrated as a radio antenna devoted to transceiver (e.g., radio) 230, it should be understood that antenna 235, and the other antenna(s) shown, may include acoustic speakers and/or microphones, infrared transmitters and/or detectors, or any other type of transmitter or detector that is appropriate for a transceiver in the wireless terminal 200. The transceivers 230–250 may be of different types (e.g., different frequency bands and/or different access protocols).

In the implementation shown in FIG. 2, the combiner 260 may combine signals to or from transceivers 240 and 250. In this manner, transceivers 240 and 250 may share the antenna 265. However, it should be noted that the present invention is not limited solely to the implementation shown in FIG. 2. For example, another implementation could contain three distinct acoustical transceivers that share a common receiver (e.g., microphone), but that each has its own transmitter (e.g., speaker). Thus, the arrangement shown in FIG. 2 is but one of many possible permutations, and fewer transceivers (e.g., one) or more transceivers (e.g., five or more) are possible within a single wireless terminal. Further, although discrete transceivers 230–250 are shown, those skilled in the art will appreciate that such transceivers may all be implemented by, for example, a single frequency-agile radio that is capable of operation in different bands and with different modulations.

Depending on the number and type of transceivers in the terminal 200, it may be capable of functioning as either a cluster head 110 or a cluster member 120. For example, the communications network 100 may employ one type of radio (e.g., a relatively high-powered radio operating in the ultra-high frequency (UHF) band, an optical laser transceiver, a microwave transceiver, or a code division multiple access (CDMA) radio) as a backbone radio, and several types of radios (e.g., those conforming to the IEEE 802.11 standard operating at 2.4 GHz, an acoustic transceiver, an omni-directional optical (e.g., infrared) transceiver, a very high frequency (VHF) transceiver, a cellular-telephone-based transceiver, a CDMA radio, an ultra-wideband (UWB) radio, or a time-division multiple access (TDMA) radio) as cluster radios. The terminal 200 may contain both "backbone" and "cluster" radios, in which case it may function as either a cluster head 110 or a cluster member 120. Exemplary terminal configurations may include one backbone radio and one cluster radio, multiple backbone radios and no cluster radios, multiple cluster radios and no backbone radios, one backbone radio and multiple cluster radios, or multiple backbone radios and multiple cluster radios. However, the terminal may contain only one or more "backbone" radios or only one or more "cluster" radios, in which case it may function only as a cluster head 110 or only as a cluster member 120.

Figure 3:
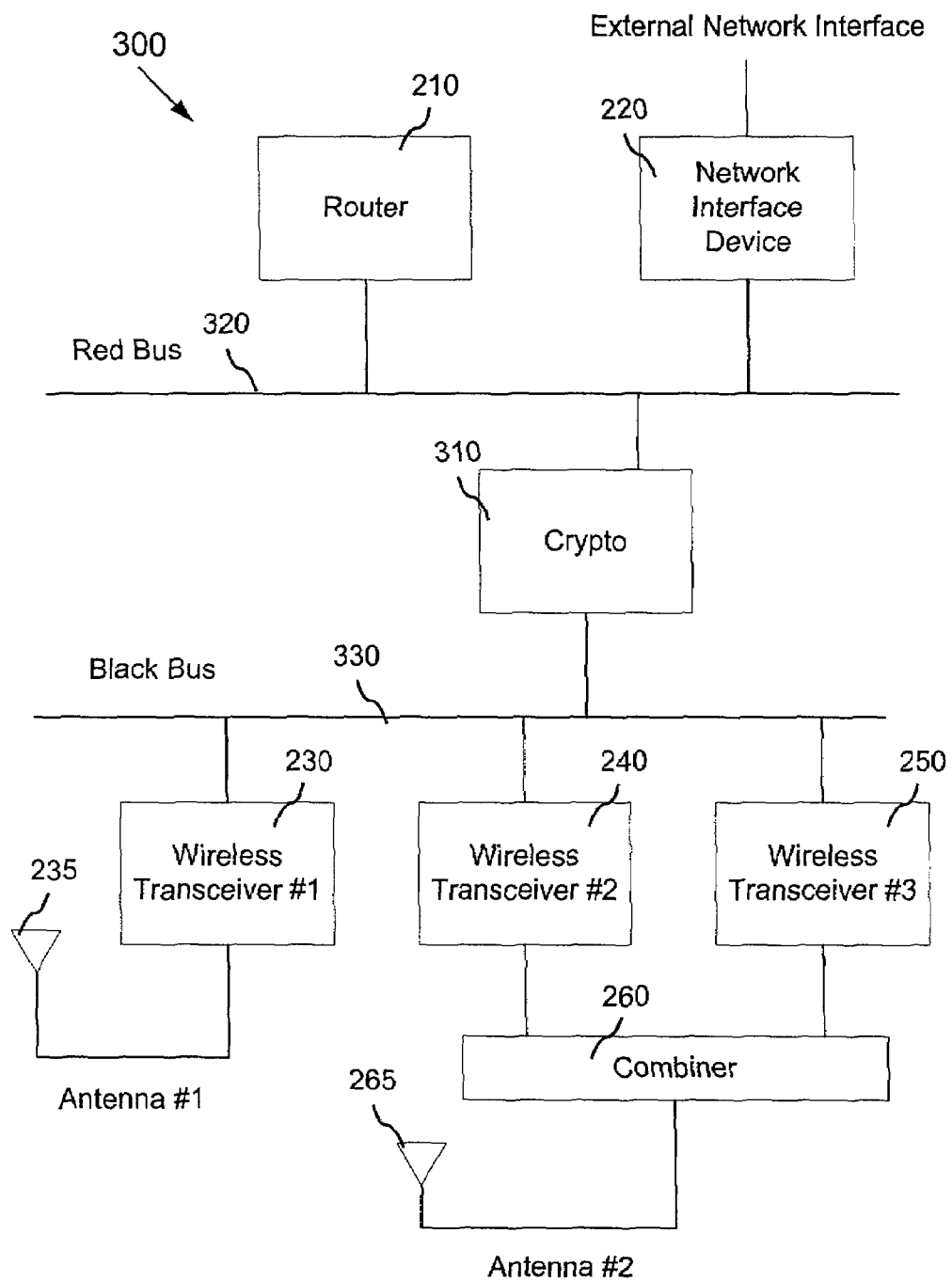
FIG. 3 is a schematic diagram illustrating a wireless terminal that includes multiple transceivers and cryptographic capability in accordance with another implementation consistent with the present invention.

FIG. 3 is a schematic diagram illustrating a wireless terminal 300 that includes multiple transceivers and cryptographic capability in accordance with another implementation consistent with the present invention. Wireless terminal 300 includes all elements 210–265 of the terminal 200 in FIG. 2, and these elements will not be described again. Wireless terminal 300 also includes a crypto block 310, a red bus 320 connected between crypto block 310 and router 210, and a black bus 330 connected between crypto block 310 and transceivers 230–250.

Crypto block 310 is configured to scramble/encode data passing from the red bus 320 to the black bus 330, and to descramble/decode data passing from the black bus 330 to the red bus 320. Crypto block 310 may include hardware or software-implemented encryption capability. Those skilled in the wireless data transmission art will make appropriate algorithm trade-offs between, for example, encryption speed and encryption strength. The presence of crypto block 310 allows messages to be scrambled/encoded when they pass among various cluster heads 110 and cluster members 120 in the wireless network 100.

Figure 4:
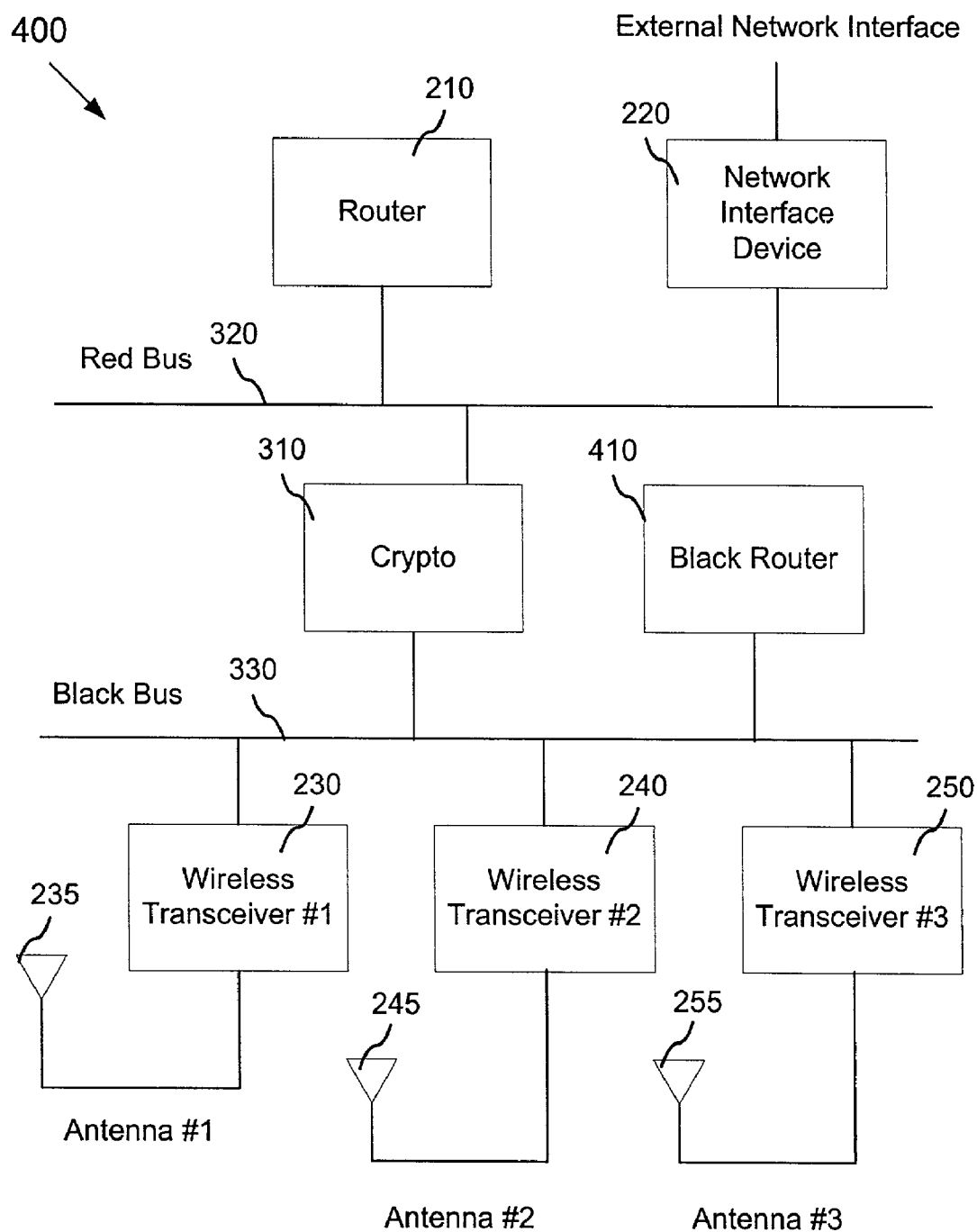
FIG. 4 is a schematic diagram illustrating a wireless terminal that includes multiple transceivers, cryptographic capability, and multiple routers in accordance with another implementation consistent with the present invention.

FIG. 4 is a schematic diagram illustrating a wireless terminal 400 that includes multiple transceivers, cryptographic capability, and multiple routers in accordance with another implementation consistent with the present invention. Wireless terminal 400 includes all elements 210–250 and 310–330 of the terminal 300 in FIG. 3 (with the exception of combiner 260), and these elements will not be described again. In FIG. 4, transceivers 240 and 250 each have dedicated antennas 245 and 255, which allows for operation over different frequency bands. Wireless terminal 400 also includes a black router 410 connected to the black bus 330.

Black router 410 may include a processor (not shown) configured to execute wireless networking algorithms among devices in communication with the black bus 330. The processor in black router 410 may include a general purpose processor, one or more ASICs, FPGAs, DSPs, etc. The processor in black router 410 may host software such as an internet protocol (IP) routing routine, network management functions, application programs, etc. Router 410 may communicate with transceivers 230–250 and any connected devices to route scrambled messages, but is isolated from the red bus 320 by the crypto block 310. Isolating the black router 410 in such a manner provides extra security for the red bus 320 which may be connected to devices containing sensitive information by the network interface device 220.

Exemplary Wireless Terminal Processing

Figure 5:
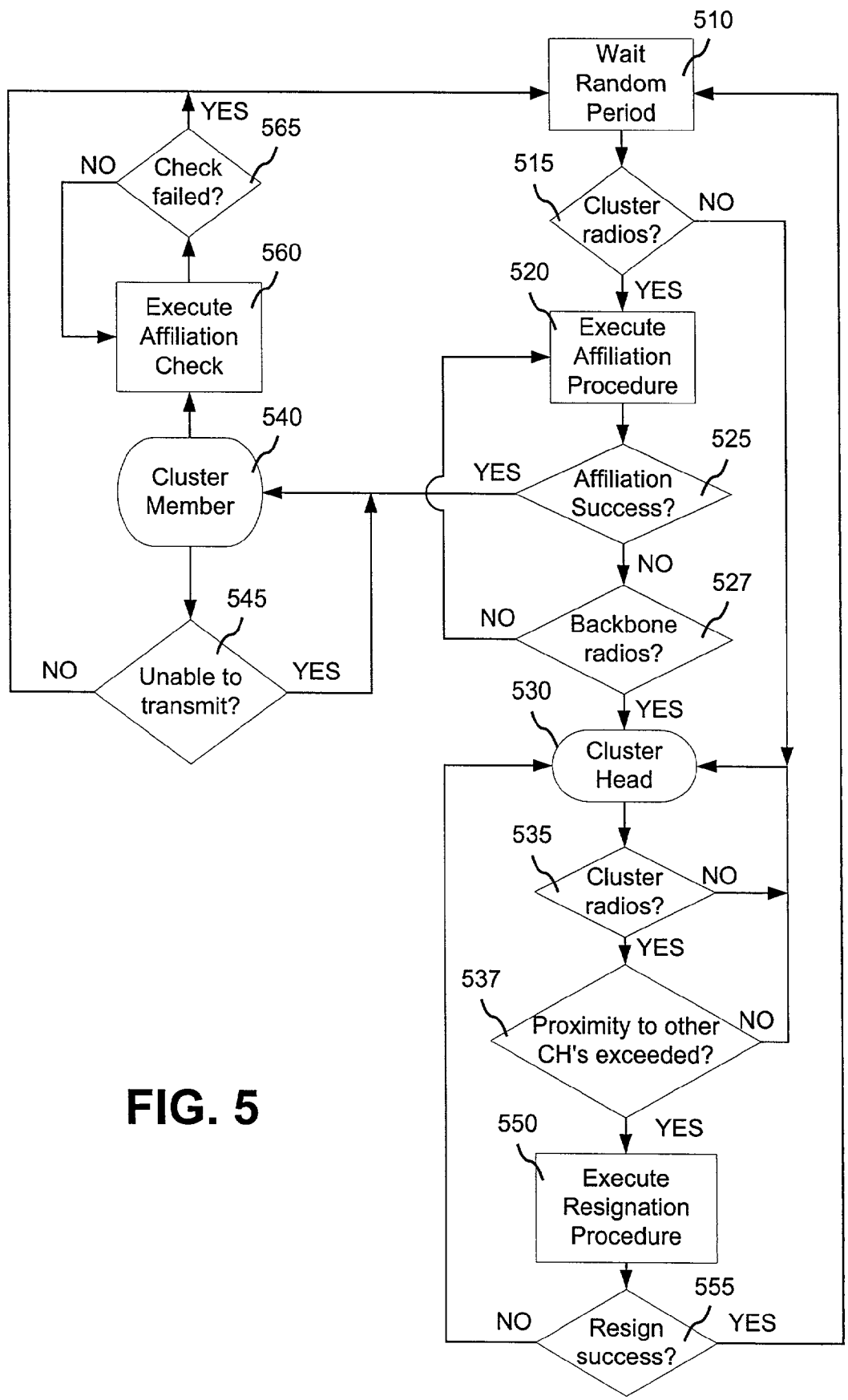
FIG. 5 is a flowchart of exemplary processing by a wireless terminal according to an implementation consistent with principles of the invention.

FIG. 5 is a flowchart of exemplary processing by a wireless terminal according to an implementation consistent with principles of the invention. The processing in FIG. 5 applies equally to any of wireless terminals 200–400 to effect the automatic organization of terminals into a communication network 100. Certain of the acts in the flowchart are described initially only in general functional terms and are later described in greater detail in other figures.

After a wireless terminal is initially activated, a delay of random duration, but within preselected bounds, is provided [act 510]. This random delay also may be introduced by several other acts in the flowchart and is influential in implementing the general and fair allocation of functions (e.g., cluster head, cluster member) to the various terminals.

After the random delay, the terminal checks whether it contains any functioning cluster radios [act 515]. If the terminal does not contain any functioning cluster radios, the terminal begins operation as a cluster head [act 530]. This ensures that a terminal without any cluster radios will immediately become a cluster head.

If the terminal contains at least one functioning cluster radio, the terminal executes an affiliation procedure [act 520]. During the affiliation procedure, the terminal attempts to affiliate with an existing cluster head terminal. This affiliation procedure is described in greater detail with reference to FIG. 6.

Figure 6:
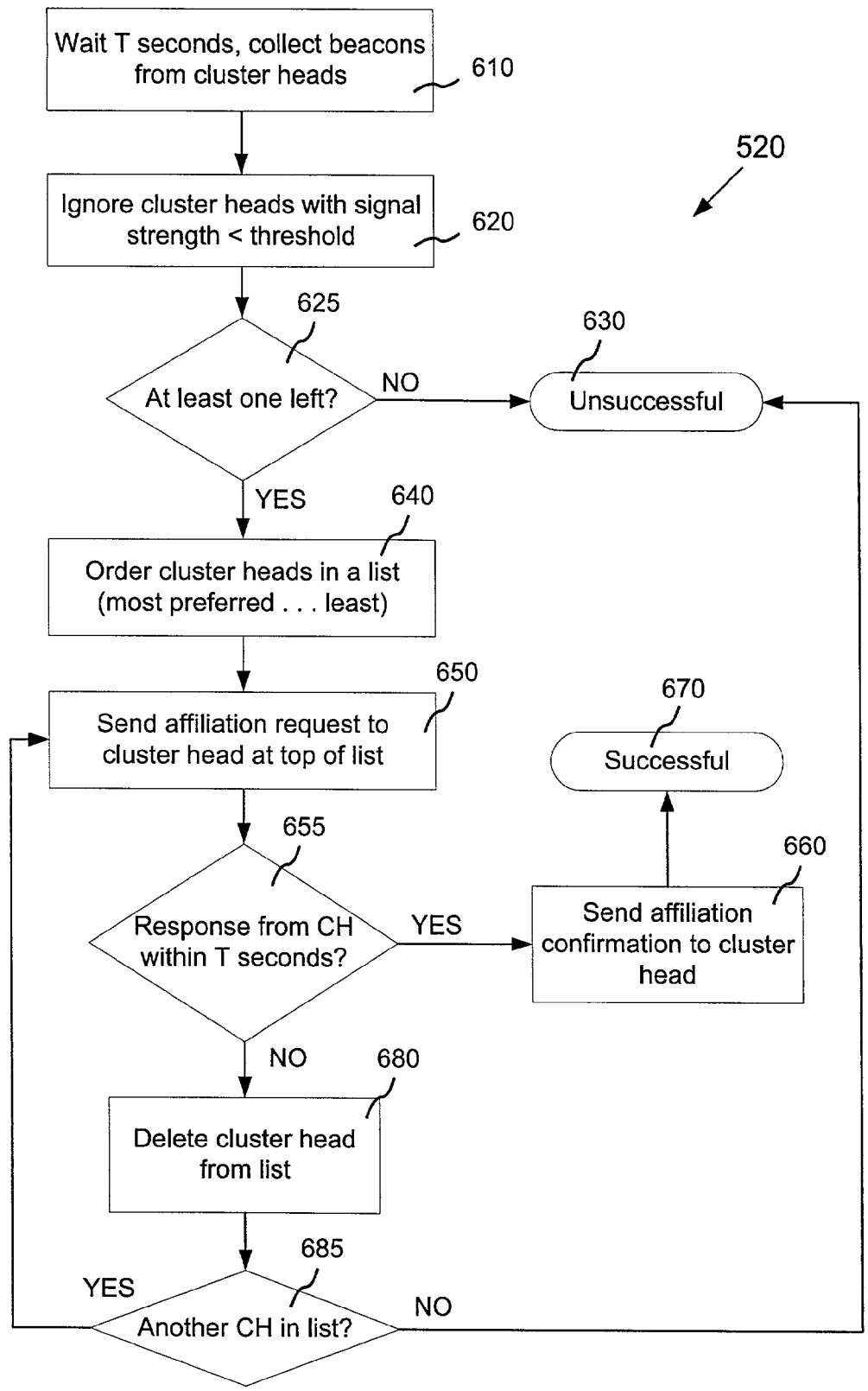
FIG. 6 is a flowchart illustrating in greater detail an affiliation procedure employed in the flowchart of FIG. 5.

FIG. 6 is a flowchart illustrating in greater detail the affiliation procedure 520 employed in the flowchart of FIG. 5. The procedure begins with the candidate terminal, possibly after a delay period T, collecting beacons (i.e., messages from head terminals that establish the head terminals' presence and availability) from all cluster head terminals within range [act 610]. The terminal performs such collection for each type of cluster radio within the terminal. The candidate terminal may collect beacons on each of its cluster radios for some period of time. The terminal in question may also establish one or more lists of such beacons, depending on the number of cluster radios it contains. The terminal may ignore head terminals with beacon signal strengths below a pre-selected threshold [act 620]. A separate threshold may be used for each type of cluster radio within the terminal.

The terminal then checks whether any cluster head terminals remain on its list after those with low signal strength are ignored [act 625]. If no head terminals remain on the list after removing those with low signal strengths, the affiliation procedure 520 is terminated as unsuccessful [act 630]. This is equivalent to a NO result from act 525 in FIG. 5. If, however, at least one head terminal remains on the list after removing those with low signal strengths, the available head terminals are ordered in a list progressing from the most preferred (e.g., that most matches a given criteria) to the least [act 640]. The ordering should take into account which type of radio within the terminal (e.g., among radios 230–250) is more "desirable" to use. Desirability of radio types may be determined by power consumption, reliability, ease of signal detection, etc.

As will be understood by those skilled in the art, the beacon collection and ordering procedure in FIG. 6 alternatively may be implemented as a continuous, background operation to maintain a "preferred list" of head terminals, because such a list is also utilized at other points in processing in FIG. 5.

An affiliation request message may be sent to the cluster head terminal that is most preferred, (i.e., the cluster head terminal at the top of the ordered list) by the corresponding cluster radio within the candidate terminal [act 650]. If, within a predetermined time interval, a response message is received from the most preferred cluster head terminal (CH) [act 655], the candidate affiliate member sends off a message confirming its affiliation to that head terminal [act 660]. The procedure 520 then is terminated as being successful [act 670]. This is equivalent to a YES decision result from act 525 in FIG. 5.

If the candidate terminal does not receive a response message from the addressed head terminal, that cluster head is deleted from the list [act 680]. The terminal then determines whether another possible cluster head terminal exists on the list [act 685]. If no other cluster heads are present on the list, the procedure 520 is terminated as unsuccessful [act 630]. If there is another possible head terminal with which affiliation would be appropriate, an affiliation request may be sent to that head terminal [act 650].

Returning to FIG. 5, if the affiliation procedure 520 is successful the terminal begins to operate as a cluster member [act 540]. As is understood by those skilled in the art, wireless networking procedures typically include acknowledgement messages which confirm that a message transmitted has been received by the intended terminal. Thus, each terminal is able to determine on an ongoing basis if it is able to communicate through the network. The terminal periodically performs such testing [act 545], and as long as the terminal is able to communicate, it remains a cluster member [act 540]. However, if at some point the terminal determines that it is no longer able to communicate, the terminal returns to an initial activation state and executes the random delay [act 510]. The terminal may then re-execute the affiliation procedure [act 520], and it may affiliate with a different cluster head.

In addition, each cluster member periodically executes an affiliation check procedure [act 560]. The affiliation check procedure allows detection of the continued presence of a cluster head for a cluster member terminal, and a relative signal strength of the cluster head. The affiliation check procedure 560 is described in greater detail in FIG. 7.

Figure 7:
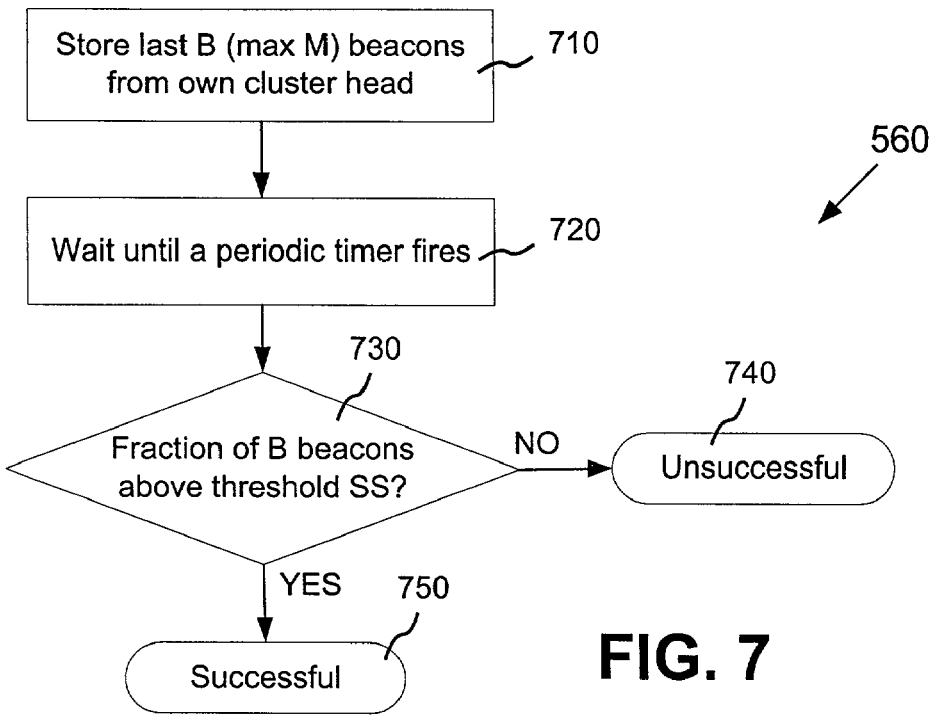
FIG. 7 is a flowchart illustrating in greater detail an affiliation check procedure employed in the flowchart of FIG. 5.

FIG. 7 is a flowchart illustrating in greater detail the affiliation check procedure 560 employed in the flowchart of FIG. 5. Each cluster member terminal may store, in an appropriate data structure, a number of "B" recent beacons from the cluster head with which it is affiliated [act 710]. The data structure may include the signal strength of the various beacons received from the cluster head. After a periodic timer fires or toggles [act 720], the terminal determines if a predetermined fraction of the stored beacons B are of an amplitude that is above a threshold signal strength value SS [act 730]. The threshold signal value may be empirically determined to optimize network performance. In other words, the cluster member determines whether communication with the current cluster head remains reliable.

If a certain fraction of the stored beacons B are of an amplitude that is below a threshold signal strength value, the affiliation check is unsuccessful [act 740]. This is equivalent to a YES result in the "check failed" determination [act 565]. If, however, a certain fraction of the stored beacons B are of an amplitude that is above the threshold signal strength value, the affiliation check is successful [act 750]. This is equivalent to a NO result in the "check failed" determination [act 565]. In such an event, the terminal may continue to periodically check the affiliation [act 560].

Returning to FIG. 5, as long as the affiliation check is satisfactory, the terminal remains as a cluster member with its pre-existing affiliation [acts 560/565]. If such an affiliation check fails, the terminal returns to an initial activation state and executes the random delay [act 510]. The terminal may then re-execute the affiliation procedure [act 520], and it may affiliate with a different cluster head.

Returning to act 525, if the affiliation procedure fails, the terminal checks whether it contains any functioning backbone radios [act 527]. If the terminal does not contain any functioning backbone radios, the affiliation procedure is re-executed [act 520]. If, however, the terminal contains at least one functioning backbone radio, the terminal begins to operate as a cluster head [act 530]. This ensures that a terminal without a backbone radio will repeatedly attempt to become a cluster member, and will never attempt to become a cluster head.

As indicated previously, one function performed by each cluster head is to periodically broadcast beacon messages from each of its functioning cluster radios, the beacon messages establishing the cluster head's presence and its availability to operate as a head for other cluster terminals. The beacon messages may be identical across different cluster radios, or may differ based on, for example, recently observed statistics for the different cluster radios. Further, each backbone radio in a cluster head terminal may periodically transmit messages, at least to the other cluster head terminals, which identify at least the members that are affiliated with that cluster head [act 530]. Thus, the cluster head terminals may maintain a data structure indicating the present constituency of the network and the configuration of the network backbone.

During operation, a cluster head may check whether it is associated with (i.e., is the head of a cluster including) any functioning cluster radios [act 535]. If the cluster head does not have any functioning cluster radios in its cluster, it continues to function as the head of a cluster [act 530]. Only if there are functioning radios in the cluster head's cluster will the cluster head perform proximity and resignation processing. This check in act 535 ensures that a cluster head will not attempt to resign if it has no associated cluster radios.

Periodically, each cluster head terminal tests its proximity to other cluster head terminals, for example, by signal strength measurements or using other data available through the exchange of messages with the cluster head terminals [act 537]. If the test indicates that proximity conditions are exceeded (i.e., that the particular terminal's operation as a head is possibly redundant and/or unnecessary), the terminal executes a resignation procedure [act 550]. This resignation procedure is described in greater detail in FIG. 8.

Figure 8:
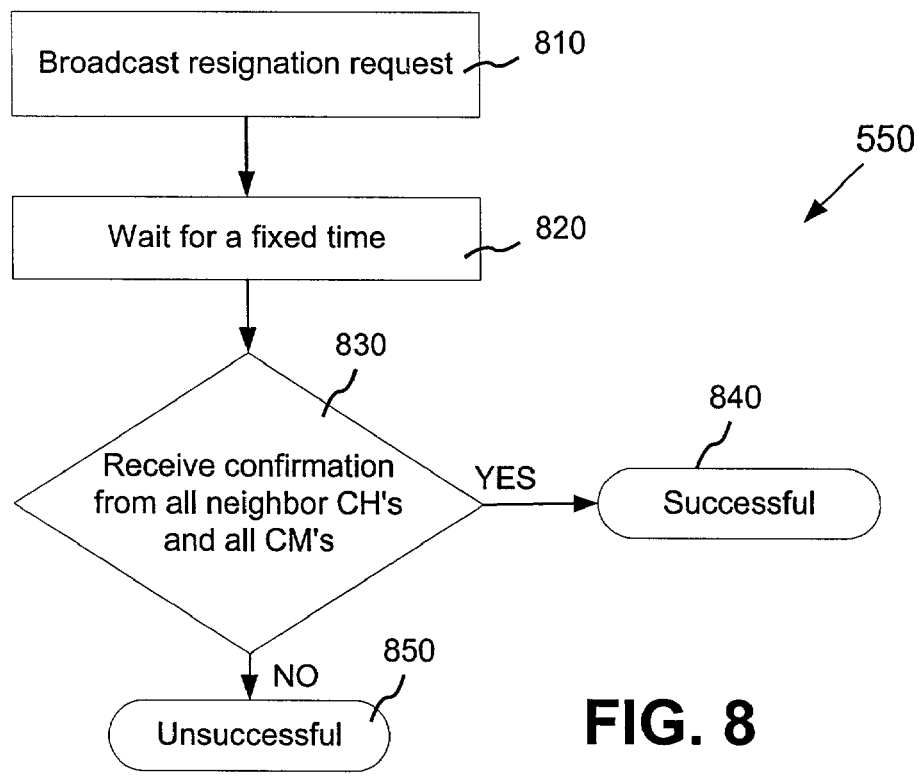
FIG. 8 is a flowchart illustrating in greater detail a resignation procedure employed in the flowchart of FIG. 5.
Figure 9:
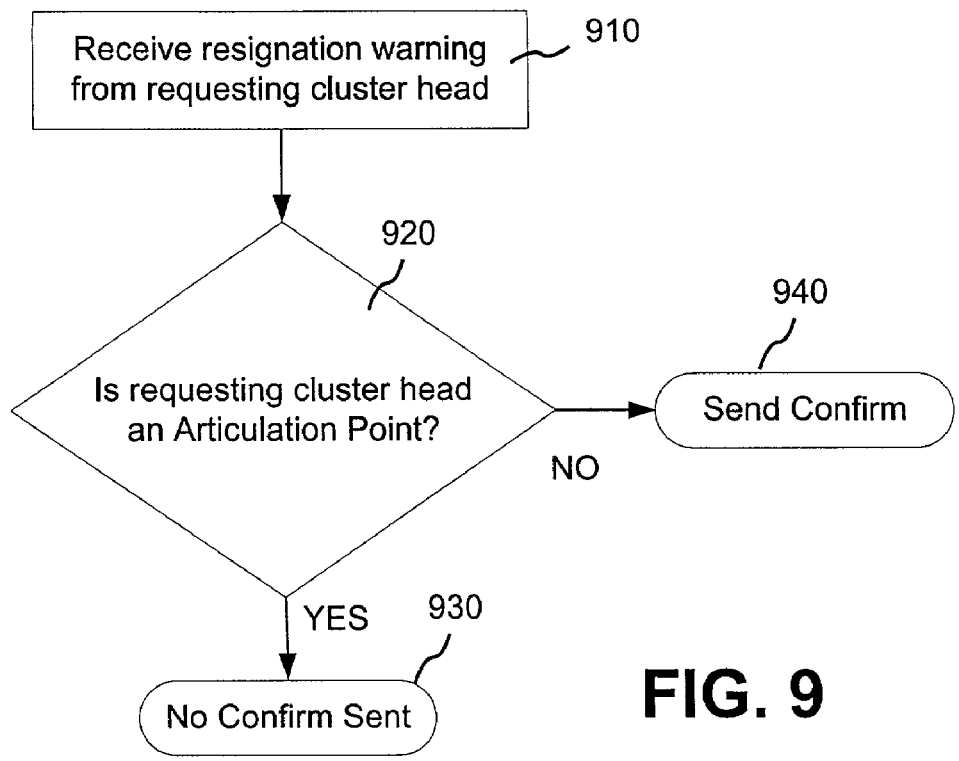
FIG. 9 is a flowchart illustrating a resignation check procedure performed by cluster heads upon receipt of a resignation request message sent in FIG. 8.

FIG. 8 is a flowchart illustrating in greater detail the resignation procedure 550 employed in the flowchart of FIG. 5. A terminal, presently acting as a cluster head, may broadcast a resignation request message [act 810]. This resignation message is broadcast to all terminals currently communicating with the cluster head that wishes to resign, namely 1) other cluster heads, and 2) cluster members associated with the cluster head. The resignation message should be transmitted on each type of radio within the cluster head. For example, a cluster head 200 may have two cluster radios affiliated with its radio 240 and ten cluster radios affiliated with its radio 250. The resignation message should therefore be transmitted on both radios 240 and 250. Assuming they receive the resignation request message, all associated cluster heads and affiliated cluster members respectively execute procedures in response to the request. FIG. 9 illustrates the procedure performed by the cluster heads upon receipt of the resignation request message, and FIG. 10 illustrates the procedure performed by the cluster members upon receipt of the resignation request message.

FIG. 9 is a flowchart illustrating a resignation check procedure performed by each connected cluster head (i.e., a "receiving" cluster head) upon receipt of the resignation request message sent in act 810 from the cluster head seeking to resign (i.e., the "requesting" cluster head). A receiving cluster head receives the resignation request/warning from the requesting cluster head [act 910]. Using data that has been collected about the network's configuration, the receiving cluster head determines whether the requesting cluster head is an articulation point in the network backbone configuration [act 920]. As is understood by those skilled in the art, the removal of a node at an articulation point would break the connectivity of the network backbone. If the requesting cluster head is an articulation point, the receiving cluster head terminal does not send a confirmation message [act 930]. Accordingly, the requesting head terminal will be blocked from resigning by such an action. If, however, the requesting cluster head is not an articulation point, the receiving cluster head terminal sends an appropriate confirmation message [act 940]. The requesting cluster head may resign if all other affected terminal also confirm.

Though the resignation check illustrated in FIG. 9 inhibits resignation if backbone connectivity would be broken (i.e., if the requesting cluster head is an articulation point), it should be understood that there are various ways of measuring connectivity in a network. A decision to inhibit resignation (e.g., act 930) alternatively may be based on a reduction in connectivity level below a preselected level according to measurements made in accordance with these known schemes.

Figure 10:
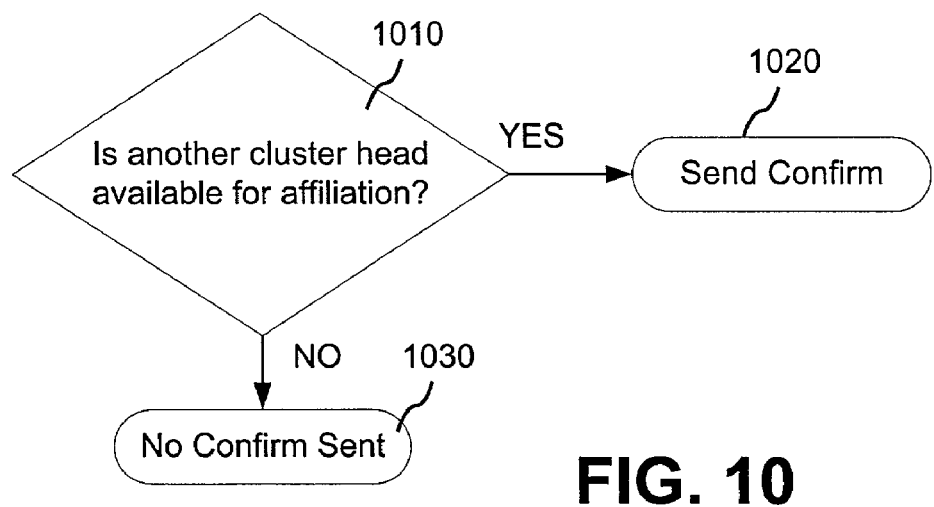
FIG. 10 is a flowchart illustrating a resignation check procedure performed by cluster members upon receipt of the resignation request message sent in FIG. 8.

FIG. 10 is a flowchart illustrating a resignation check procedure performed by each connected cluster member (i.e., a "receiving" cluster member) upon receipt of the resignation request message sent in act 810 from its requesting cluster head. If a receiving cluster member terminal receives a resignation request, the cluster member checks whether another head terminal is available for affiliation [act 1010]. This check is performed using the data in the list prepared in act 640 of FIG. 6 (or from a "preferred" list if the beacon collection and ordering is being performed as a background task). If another cluster head is available for affiliation by the receiving cluster member, the receiving cluster member sends an appropriate confirmation message [act 1020]. Alternately, if no cluster head is available for affiliation by the receiving cluster member, no confirmation message is sent [act 1030]. In this manner, a receiving cluster member may inhibit the proposed resignation.

Returning to FIG. 8, the requesting cluster head waits a predetermined length of time after sending its resignation request [act 820]. This wait time allows the receiving cluster heads and the receiving cluster members time to perform their respective routines as previously described in FIGS. 9 and 10. The requesting cluster head determines whether it has received resignation confirmation messages from all neighboring cluster heads and all affiliated cluster member terminals [act 830]. If all such cluster head and cluster member terminals have sent confirmation messages and the messages have been received by the resigning head terminal, the resignation procedure terminates as successful [act 840]. This is equivalent to a YES result in the "resign success" determination [act 555] in FIG. 5. If any neighboring cluster head or affiliated cluster member does not provide a confirming message, the procedure terminates as unsuccessful and the terminal continues in its role as a cluster head [act 850]. This is equivalent to a NO result in the "resign success" determination [act 555] in FIG. 5.

Although described as requiring unanimous confirmation for a resignation, the above-described processing may alternatively require less than unanimous confirmation. For example, if only one cluster head or cluster member does not supply a confirmation, a requesting cluster member may still be allowed to resign. Those skilled in the art will balance loss of network or terminal connectivity with the benefit of allowing unimpeded cluster head resignation.

Returning to FIG. 5, if the conditions for resignation are met, the terminal processing returns to act 510 and after the random delay and checking for functioning cluster radios [act 515], again may attempt the affiliation procedure [act 530]. In this manner, assuming the presence of a functioning cluster radio/transceiver, the terminal may commence operation as a cluster member rather than a cluster head as before.

The foregoing description of preferred embodiments of principles of the invention provides illustration and description, but is not intended to be exhaustive or to limit the invention to the precise form disclosed. Modifications and variations are possible in light of the above teachings or may be acquired from practice of the invention. For example, although a two level network architecture has been described, it should be understood that implementations of the invention are inherently recursive. Thus, a three or four level architecture may be implemented, using high-level cluster heads to connect with clusters of lower-level cluster heads. In one implementation, power levels may be increased for these high-level cluster heads. In another, the high-level heads may comprise a different type of transceiver (e.g., microwave, etc.) than the transceivers in the lower levels of the network.

Thus, the present invention is intended to encompass using multiple types of transceivers (e.g., radios) among levels of the above-described network and/or within levels of the network. For example, a network consistent with the present invention may include a different type of radio used for the backbone links than is used for the cluster members. A network consistent with the present invention may additionally or alternately incorporate more than one type of radio within a particular level. That is, two or more different types of radios may be used as cluster members. A particular cluster may incorporate only one type of radio, or may incorporate more than one type for its cluster members. If more that one type of radio is used within a cluster, the cluster head terminal should contain enough transceivers (e.g. more than one) to enable communication with the different types of cluster member radios. Similarly, more than one type of backbone radio may be utilized, as long as the affected cluster heads contain at least one type (and preferably all types) of the backbone radios, so that connectivity among cluster head nodes is not adversely affected.

As previously noted, the above-described terminals (e.g., in FIGS. 2–4) may be stationary terminals or mobile terminals. As used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

In addition to the implementations described above, cluster members may advantageously communicate, not only with their cluster head, but also with other cluster members. Those skilled in the art will appreciate how to implement such communication after studying co-pending, commonly assigned, application Ser. No. 09/660,521, filed Sep. 12, 2000, entitled "Using Direct Cluster Member to Cluster Member Communication to Improve Performance in Mobile Communication Systems." Also, cluster members may advantageously communicate, not only with their associated cluster head, but also with other cluster heads. Those skilled in the art will appreciate how to implement such communication after studying co-pending, commonly assigned, application Ser. No. 09/513,757, filed Feb. 25, 2000, entitled "A Node Belonging to Multiple Clusters in an Ad-Hoc Wireless Network."

Further, it may be desirable to control network growth and structure by having cluster heads resign based on other criteria than proximity to each other. Those skilled in the art will appreciate how to implement such resignation after studying co-pending, commonly assigned, application Ser. No. 09/624,635, filed Jul. 24, 2000, entitled "Cluster Head Resignation to Improve Routing in Mobile Communication Systems." Also, it may be desirable to control network traffic and performance, for example, by changing the rate at which cluster heads transmit beacon signals. Those skilled in the art will appreciate how to implement such transmission after studying co-pending, commonly assigned, application Ser. No. 09/584,973, filed Jun. 1, 2000, entitled "Method and Apparatus for Varying the Rate at Which Broadcast Beacons Are Transmitted."

No element, act, or instruction used in the description of the present invention should be construed as critical or essential unless explicitly described as such. Also, as used herein, the article "a" is intended to include one or more items. Where only one item is intended, the term "one" or similar language is used. The scope of the invention is defined by the claims and their equivalents.

What is claimed is:

1. A wireless network, comprising:
    a plurality of first wireless terminals configured to operate as cluster heads by communicating with at least one other cluster head over one or more backbone links, each one of the plurality of first wireless terminals including one or more backbone transceivers,
    at least one second wireless terminal configured to operate as a cluster member by communicating with an associated cluster head over one or more local links, each one of the at least one second wireless terminals including one or more cluster transceivers,
    wherein at least one of the first or second wireless terminals includes both a backbone transceiver and a cluster transceiver, and
    a third wireless terminal configured to:
        determine whether the third wireless terminal includes a functioning backbone transceiver, and
        affiliate with one of the first wireless terminals when the third wireless terminal includes no functioning backbone transceiver.

2. The wireless network of claim 1, wherein the backbone transceiver is configured to operate over first distances and in a first frequency range, and
    wherein the cluster transceiver is configured to operate over second distances that are shorter than the first distances and in a second frequency range that is different from the first frequency range.

3. The wireless network of claim 2, wherein the backbone transceiver includes a first radio operating in an ultrahigh frequency (UHF) range, and
    wherein the cluster transceiver includes a second radio operating at substantially 2.4 GHz.

4. The wireless network of claim 1, wherein at least one of the first wireless terminals includes two different types of backbone transceivers.

5. The wireless network of claim 1, wherein at least one of the first wireless terminals includes two different types of cluster transceivers.

6. The wireless network of claim 1, wherein at least one of the at least one second wireless terminals includes two different types of cluster transceivers.

7. The wireless network of claim 1, wherein at least one of the first wireless terminals includes a backbone transceiver and a cluster transceiver.

8. The wireless network of claim 1, wherein the one or more backbone transceivers includes one or more of the following: a radio operating in an ultrahigh frequency (UHF) range, a laser transceiver, a microwave transceiver, or a code division multiple access (CDMA) radio.

9. The wireless network of claim 1, wherein the one or more cluster transceivers includes one or more of the following: an acoustic transceiver, an omni-directional optical transceiver, a very high frequency (VHF) transceiver, a code division multiple access (CDMA) radio, an ultra-wideband (UWB) radio, or a time-division multiple access (TDMA) radio.

10. A method performed by a first terminal, the first terminal being a wireless, mobile terminal, the method comprising:
    receiving beacons from a plurality of second terminals, where at least one of the beacons is received according to a first wireless access protocol and at least one other one of the beacons is received according to a second wireless access protocol;
    determining a signal strength associated with each of the second terminals based on the beacons received according to the first and second wireless access protocols;
    sending an affiliation message to one of the second terminals based on the determined signal strength;
    determining whether a response to the affiliation message is received from the one of the second terminals;

affiliating with the one of the second terminals when the response to the affiliation message is received from the one of the second terminals; and periodically repeating the receiving beacons, determining a signal strength, sending an affiliation message, determining whether a response to the affiliation message is received, and affiliating with the one of the second terminals as the first terminal moves to different locations.

11. A first terminal, comprising:

means for receiving beacons from a plurality of second terminals, where at least one of the beacons is received according to a first wireless access protocol and at least one other one of the beacons is received according to a second wireless access protocol;

means for determining a signal strength associated with each of the second terminals based on the beacons received according to the first and second wireless access protocols;

means for sending an affiliation message to one of the second terminals based on the determined signal strength;

means for determining whether a response to the affiliation message is received from the one of the second terminals;

means for affiliating with the one of the second terminals when the response to the affiliation message is received from the one of the second terminals; and means for periodically repeating the receiving beacons, determining a signal strength, sending an affiliation message, determining whether a response to the affiliation message is received, and affiliating with the one of the second terminals as the first terminal moves to different locations.

* * * * *